United States Patent [19]

Kurata et al.

[11] 4,390,801

[45] Jun. 28, 1983

[54] CIRCUIT FOR REPRODUCING A CLOCK SIGNAL

[75] Inventors: Hirotaka Kurata, Kokubunji; Shiro Yoshida, Machida, both of Japan

[73] Assignee: Trio Kabushiki Kaisha, Tokyo, Japan

[21] Appl. No.: 384,233

[22] Filed: Jun. 2, 1982

[30] Foreign Application Priority Data

Jun. 8, 1981 [JP] Japan .................................. 56-87942

[51] Int. Cl.³ ........................ H03K 5/13; H03K 17/28
[52] U.S. Cl. ...................................... 307/409; 307/269
[58] Field of Search ................................ 307/409, 269

[56] References Cited

U.S. PATENT DOCUMENTS 3,997,800 12/1976 Bain ..................................... 307/269
4,054,950 10/1977 Boone ............................. 307/269 X
4,208,724 6/1980 Rattlingourd .................. 307/269 X

OTHER PUBLICATIONS

The Compact Disc Digital Audio System: Modulation and Error-Correction, Vries et al., Oct. 31/Nov. 3, 1980, Audio Engineering Society Preprint.
A New Look-Ahead Code for Increased Data Density, Jacoby, IEEE Transactions on Magnetics, vol. MAG-13, No. 5, Sep. 1977.

Primary Examiner—Donald A. Griffin
Attorney, Agent, or Firm—Gerald J. Ferguson, Jr.; Joseph J. Baker; C. Lamont Whitham

[57] ABSTRACT

A circuit for reproducing a clock signal from digital signals reproduced from a recording medium makes self-clocking possible. The circuit includes a phase lock loop having a voltage-controlled oscillator that generates an oscillation output at a frequency which is approximately equal to or an integral multiple of the frequency of the clock signal contained in the reproduced signal. A pulse generating device outputs pulses of a fixed amplitude, triggered by the leading or trailing edge of the input signal, to the phase lock loop. An oscillation device outputs pulses having approximately the same period as the clock signal period. The oscillation device is triggered by the leading or trailing edge of the input signal. A selecting device gates the output pulses of the oscillation device to the phase lock loop. The selecting device interpolates the output pulse spacing of the pulse generating device and the output pulses of the oscillation device so that a clock signal output is obtained from the phase lock loop.

9 Claims, 13 Drawing Figures

CIRCUIT FOR REPRODUCING A CLOCK SIGNAL

BACKGROUND OF THE INVENTION

This invention relates to a circuit for reproducing a clock signal which is applicable to magnetic tape recorded information playback systems, digital audio disc players, etc., and more particularly, it relates to a circuit to reproduce a clock signal from reproduced signals of digital information recorded on a recording medium after modulation to make self-clocking possible.

Figure 1A:
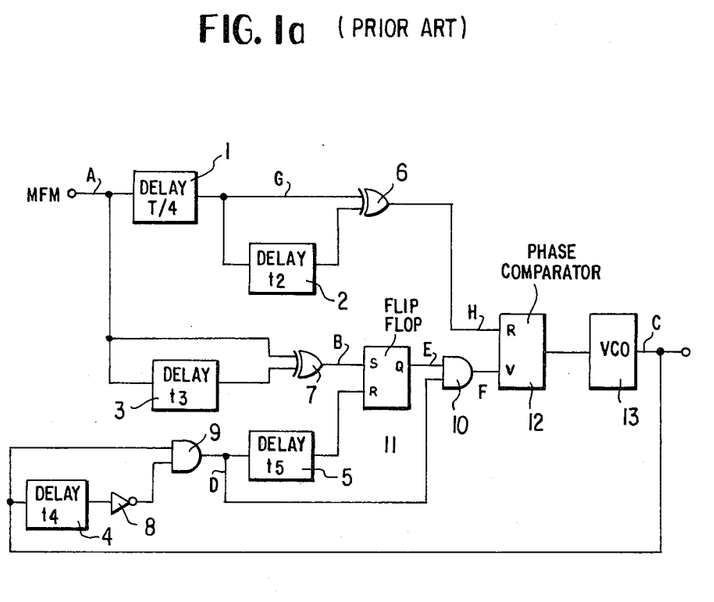
FIGS. 1(a) and (b) are respectively a block diagram of the conventional clock signal reproduction circuit and waveforms provided for the explanation of the operation of the circuit.
Figure 2A:
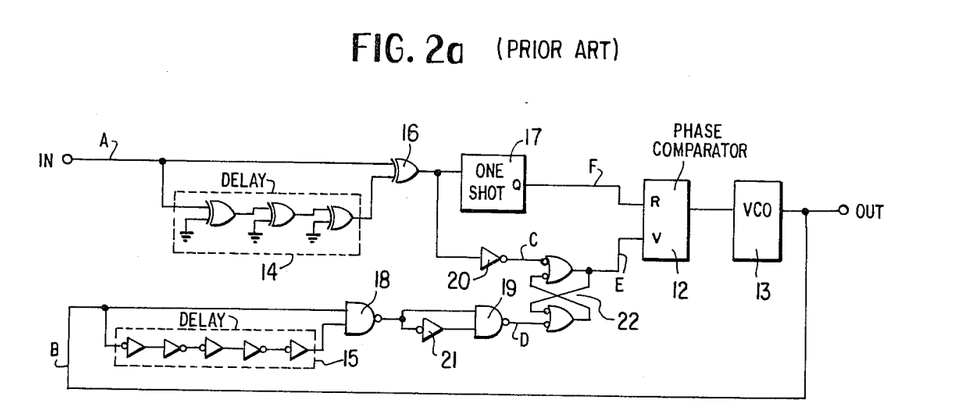
FIGS. 2(a) and (b) are respectively a block diagram of the conventional clock signal reproduction circuit and waveforms provided for the explanation of the operation of the circuit.

Conventional circuits to reproduce clock signals are configured, for example, as shown in FIG. 1(a) and FIG. 2(a), in which band width is compressed according to a modulation system where digital information is predetermined, for example, systems such as $M^2FM$, 3PM, etc., and clock signals are reproduced from playback signals of signals containing clock signal information.

Figure 1B:
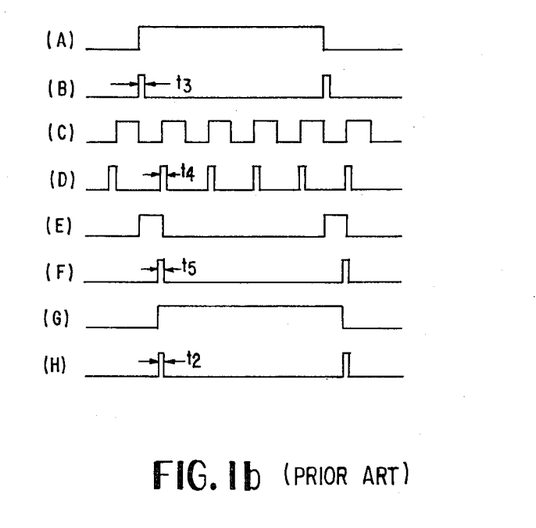

The circuit for reproducing a clock signal shown in FIG. 1(a) is comprised of a phase lock loop (PLL) circuit which consists of a ¼ time delay circuit 1 of the clock signal period T of the input signal, an MFM signal, delay circuits 2, 3, 4, and 5, exclusive OR circuits 6 and 7, inverter 8, AND gates 9 and 10, flip-flop 11, phase comparator 12, and voltage-controlled oscillator (VCO) 13. As shown in FIG. 1(b) (H), pulses having a pulse width of $\tau_2$ are obtained at the leading edge and trailing edge of the T/4 delayed signal of the MFM signal shown in FIG. 1(b) (A) due to delay circuits 1 and 2, and the exclusive OR circuit 6, and are inputted into the PLL circuit. And, as shown in FIG. 1(b) (F), pulses having a pulse width of $\tau_5$ corresponding to the output of VCO 13 are obtained due to delay circuits 3, 4, and 5, exclusive OR circuit 7, inverter 8, AND gates 9 and 10, and flip-flop 11, and are inputted into the PLL circuit, their phases compared, and the clock signal is obtained from the output of the VCO 13. In FIG. 1(b), (B), (C), (D), (E), and (G) are output signal waveforms of the exclusive OR circuit 7, VCO 13, AND gate 9, flip-flop 11, and delay circuit 1, respectively.

Figure 2B:
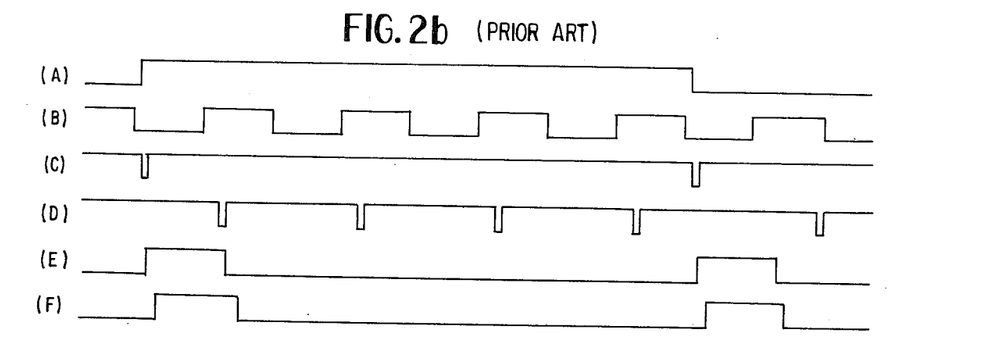

The clock signal reproduction circuit shown in FIG. 2(a) is comprised of a PLL circuit which consists of a delay circuit 14 comprised of exclusive OR circuits, a delay circuit 15 comprised of inverters, an exclusive OR circuit 16, monostable multivibrator or one shot 17, NAND gates 18 and 19, inverters 20 and 21, flip-flop 22, phase comparator 12, and VCO 13. As shown in FIG. 2(b) (F), pulses with a predetermined time delay are obtained from the leading edge and the trailing edge of the input signal shown in FIG. 2(b) (A) due to the delay circuit 14, exclusive OR circuit 16, and monostable multivibrator 17, and inputted into the phase comparator 12; and as shown in FIG. 2(b) (E), pulses with a predetermined time delay are obtained from the leading edge and trailing edge of the input signal shown in FIG. 2(b) (A) due to the delay circuit 15, NAND gates 18 and 19, inverters 20 and 21, and flip-flop 22, and inputted into the phase comparator 12, their phases compared, and clock signal is obtained from the output of the VCO 13. In FIG. 2(b), (B), (C), and (D) are signal waveforms of VCO 13, inverter 20, i.e. the set pulse of flip-flop 22, and NAND gate 19, i.e. reset pulse of flip-flop 22.

In the case of conventional clock signal reproduction circuits such as described above, the VCO's oscillation frequency is set to the approximate value of the frequency of the clock signal contained in the input signal or integral multiples thereof, and every time a leading edge or trailing edge of the input signal occurs, the input is applied to the phase comparator and their phases are compared, the PLL circuit is operated, and a clock signal is reproduced. Consequently, in the case of input signals with fluctuating leading edge and trailing edge times, the frequency dividing ratio of the signals between the VCO and phase comparator changes, and the loop gain of the PLL circuit is dependent on the generating time of the above-mentioned leading edge and trailing edge. Thus, there are shortcomings that make it difficult to construct a stable PLL circuit or a PLL circuit having a constant damping factor and a constant frequency zone.

In addition, due to the fact that the interval between the leading edge and trailing edge times of the input signal is not interpolated, when the variable range of VCO is widened, there is a shortcoming that locking occurs at a frequency different from the original clock signal frequency in the input signal, that is, the so-called mislocking phenomenon occurs. Conversely, when the variable range of VCO is restricted in order to prevent the mislocking phenomenon, there is a shortcoming that the response time corresponding to other characteristics of the PLL circuit, for example, capture range, lock range, step phase input, becomes restricted. When using a conventional clock signal reproduction circuit as described above in series as a part of another servo loop, there is a shortcoming which complicates the determination of stable conditions and response characteristics of the servo loop.

SUMMARY OF THE INVENTION

This invention was made in view of the above-mentioned problems, and the objective is to produce a circuit for reproducing a clock signal without the above-mentioned shortcomings.

The circuit according to the invention includes a PLL having a VCO that generates an oscillation output at a frequency which is approximately equal to or an integral multiple of the frequency of the clock signal contained in the reproduced signal. A pulse generating device outputs pulses of a fixed amplitude, triggered by the leading or trailing edge of the input signal, to the PLL. An oscillation device outputs pulses having approximately the same period as the clock signal period. The oscillation device is triggered by the leading or trailing edge of the input signal. A selecting device gates the output pulses of the oscillation device to the PLL. The selecting device interpolates the output pulse spacing of the pulse generating device and the output pulses of the oscillation device so that a clock signal output is obtained from the PLL.

DESCRIPTION OF THE PREFERRED EMBODIMENTS

Figure 3:
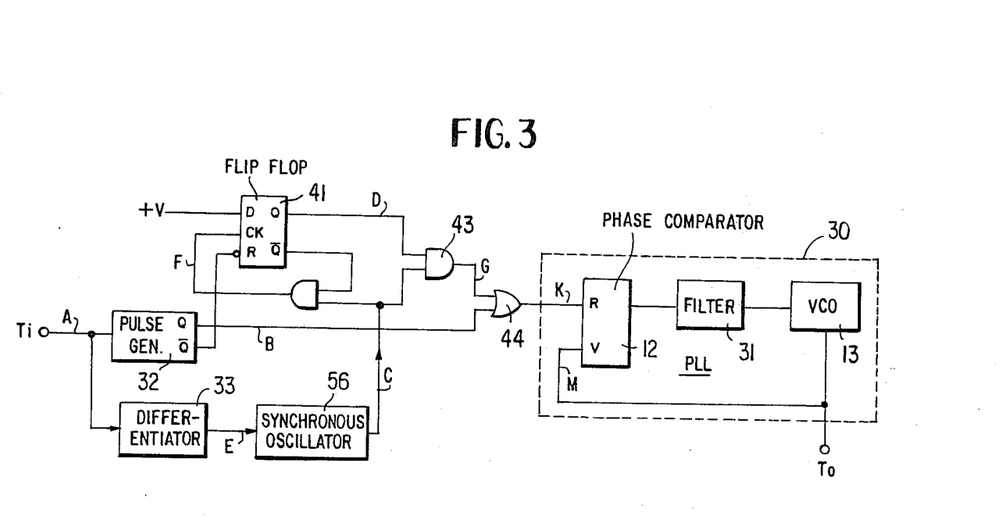
FIGS. 3 and 4 are respectively a block diagram of the first practical example of this invention and waveforms provided for the explanation of the operation of the circuit.

FIG. 3 is a block diagram of the first practical example of this invention. The PLL circuit 30 is comprised of a phase comparator 12, loop filter 31, and VCO 13. The VCO 13 is set such that it generates an oscillation output having a frequency approximately equal to or an integral multiple of the frequency of the clock signals contained in the input signal impressed on the input terminal $T_i$. When oscillating in an integral multiple, a frequency divider is placed in that output so that the frequency of the input signal of the PLL circuit 30 and the output signal of VCO 13 become equal. A pulse generator 32 generates output pulses having a width of T/2 and inverted output pulses that are the inversion of the said output pulses when the input signal is impressed and triggered by the leading edge and the trailing edge of the input signal, the clock signal period being T. The output pulse of pulse generator 32 is inputted into the PLL circuit 30 through the OR gate 44. A differentiating circuit 33 differentiates the input signal and provides an input to a triggerable oscillator (synchronous oscillator) 56. The triggerable oscillator 56 is triggered by the output of the differentiating circuit 33 and outputs pulses having a frequency approximately equal to the frequency of the clock signal contained in the input signal which was impressed on the input terminal $T_i$. The periodic time of the output pulse of the triggerable oscillator 56 is set so as not to cause a difference of more than T/2 between the leading edge and the trailing edge of the input signal impressed on the input terminal $T_i$. D flip-flop 41, AND gates 42 and 43, and OR gate 44 comprise a selector circuit that inputs the output pulse of the triggerable oscillator 56 into the PLL circuit 30 through the OR gate 44 in the intervals of adjacent output pulses outputted from the pulse generator 32 through the OR gate 44. In other words, voltage V, the inverted output pulse of the output pulse of the pulse generator 32, and the output of the AND gate 42 are impressed respectively on the input terminal D of D flip-flop 41, reset terminal R, and clock pulse input terminal CK. The $\overline{Q}$ output and the Q output of D flip-flop 41 are inputted respectively into AND gates 42 and 43. The output of triggerable oscillator 56 is inputted into AND gates 42 and 43 separately. The output of AND gate 43 is inputted into PLL circuit 30 through OR gate 44. The output of triggerable oscillator 56 is inputted into PLL circuit 30 only during the high potential period of the Q output of D flip-flop 41.

Figure 4:
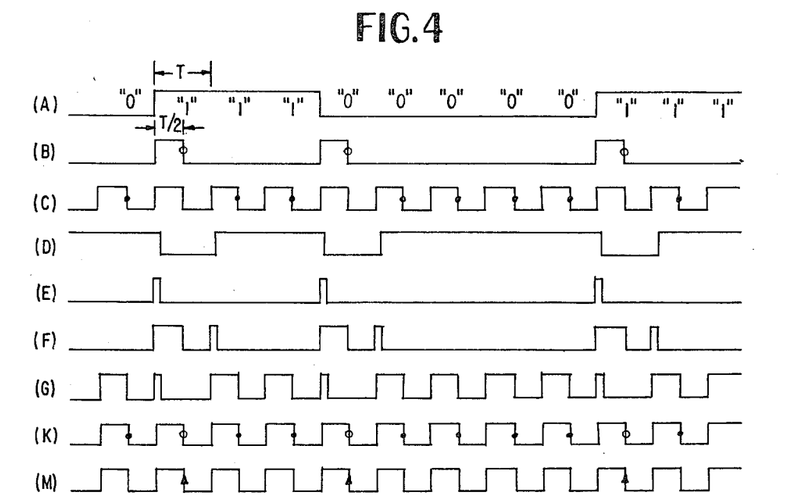

In the first practical example of this invention configured as above, the reproduced signals of digital information are recorded upon modulation to make self-clocking possible, for example, the input signal shown in FIG. 4 (A), is impressed on the input terminal $T_i$. As a result of the leading edge and the trailing edge of input signals, pulse generator 32 outputs the output pulse shown in FIG. 4 (B) having a pulse width of ½ the periodic time T of the clock signal contained in the input signal, and an inverted output pulse of the said output pulse respectively on output terminals Q and $\overline{Q}$. Since the inverted output pulse generated from pulse generator 32 resets the D flip-flop 41 and the output of AND gate 42 is being impressed as the clock pulse, the clock pulse of D flip-flop 41 is as shown in FIG. 4 (F), and the Q output of D flip-flop 41 results in a waveform shown in FIG. 4 (D). Therefore, AND gate 43 closes its gate for the duration of the low potential of the Q output of D flip-flop 41 shown in FIG. 4 (D), and the output pulse of pulse generator 32 is inputted into PLL circuit 30 through OR gate 44. The input signal is differentiated by differentiating circuit 33, and differentiating circuit 33 outputs the output pulse shown in FIG. 4 (E) in synchronism with the leading edge and trailing edge of the input signal. The output pulse of differentiating circuit 33 triggers the triggerable oscillator 56 and the triggerable oscillator 56 outputs the pulse shown in FIG. 4 (C). In the intervals of adjacent output pulses shown in FIG. 4 (B) outputted from pulse generator 32, the Q output of D flip-flop 41 becomes a high potential as shown in FIG. 4 (D), and the AND gate 43 opens its gate. Thus, in these intervals, the output pulse of triggerable oscillator 56 is inputted to PLL circuit 30 through AND gate 43 and OR gate 44. Consequently, the input signals for PLL circuit 30 are, as shown in FIG. 4 (K), the output pulse of pulse generator 32 and the output pulse of triggerable oscillator 56 inputted in the intervals of the above output pulses, and the output pulse spacing of pulse generator 32 will be interpolated by the output pulses of triggerable oscillator 56. In FIG. 4 (K), an "o" mark indicates output pulse of pulse generator 32, and a "." mark, the output pulse of triggerable oscillator 56. FIG. 4 (G) shows the waveform of the output of AND gate 43. Then, owing to the fact that the output pulse of pulse generator 32 has been impressed on PLL circuit 30, the output pulse of the pulse generator 32 and the output pulse of VCO 13 shown in FIG. 4 (M) are compared for phase at PLL circuit 30, and the PLL circuit 30 changed to a locked state. On the other hand, the intervals of the output pulses of pulse generator 32 are interpolated by the output pulses of triggerable oscillator 56 which are generating the output pulse of a period approximately equal to the period of the clock signal triggered in synchronism by the leading and trailing edges of the input pulse. Thus, PLL circuit 30 maintains its locked state even in the output pulse spacing of pulse generator 32. Consequently, PLL circuit 30 does not cause mislocking even in the intervals of the output pulses generated from pulse generator 32, and reproduced clock signals are obtainable from output terminal $T_0$.

Figure 5:
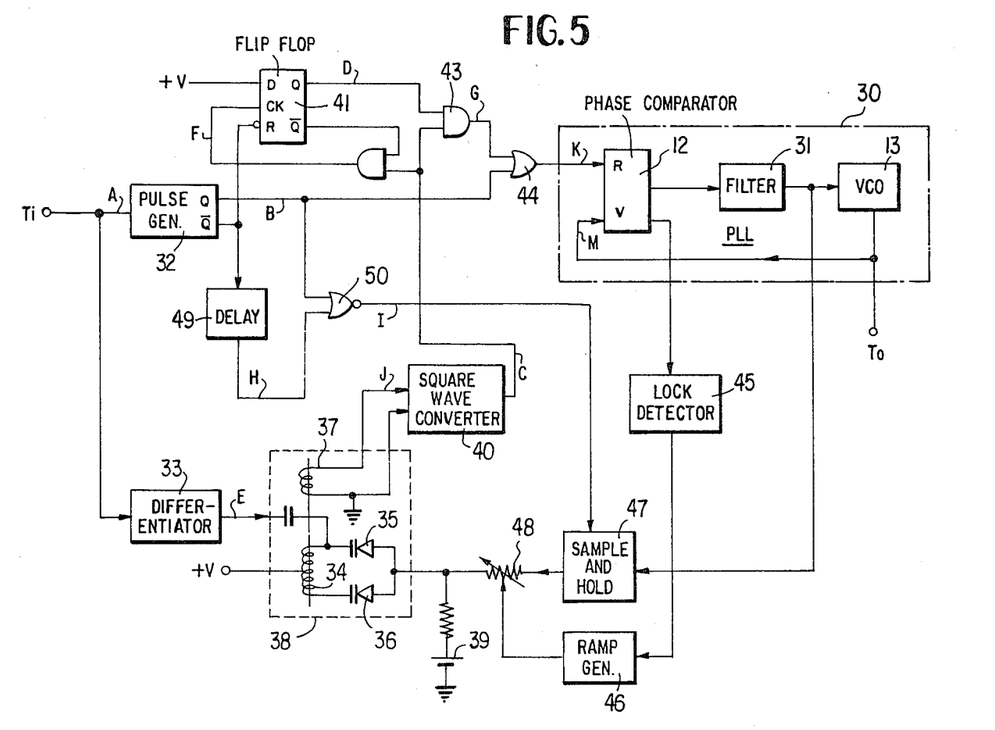
FIGS. 5 and 6 are respectively a block diagram of the second practical example of this invention and a diagram provided for the explanation of the operation of the circuit.

FIG. 5 is a block diagram of the second practical example of this invention, and the same components as in the first practical example of this invention shown in FIG. 3 are shown by using the same notations. In this practical example, pulse generator 32, differentiating circuit 33, D flip-flop 41, AND gates 42 and 43, OR gate 44, and PLL circuit 30 are configured identically to the first practical example of this invention shown in FIG. 3. In place of triggerable oscillator 56, a resonant circuit 38 consisting of coils 34 and 37 and variable-capacitance diodes 35 and 36 is connected and configured such that the resonant output is generated from coil 37 impressed by the output pulse of differentiating circuit 33. Resonant circuit 38 is configured so that the voltage of the power supply 39 is impressed on the cathodes of the variable-capacitance diodes 35 and 36, the resonant frequency is set by the voltage of the power supply 39, and at the same time, the resonant frequency changes with the external voltage superimposed on the voltage of the power supply 39. When the above-mentioned external voltage is not superimposed on the voltage of power supply 39, the resonant frequency of the resonant circuit 38 is set at the frequency of a slightly longer period than the clock signal period. The output of resonant circuit 38 outputted from coil 37 is inputted to a square wave converter circuit 40 and converted to a rectangular wave, and the output pulse of square wave converter circuit 40 is inputted to AND gates 42 and 43 instead of the output pulse of triggerable oscillator 46. A lock detector circuit 45 detects the locked state of PLL circuit 30. A ramp generator 46 outputs ramp signals driven by the output of lock detector circuit 45. A voltage-controlled variable resistor 48 has a gain which is controlled by the ramp output voltage of ramp generator 46. The voltage-controlled variable resistor 48 may be a voltage-controlled variable gain amplifier that changes gain with the ramp signal. Voltage-controlled variable resistor 48 is configured such that when the lock detector circuit 45 is not detecting the locked state of PLL circuit 30, it displays a high resistance value of nearly open, and when the lock detector circuit 45 detects the locked state of PLL circuit 30, the resistance value is reduced according to the output of ramp generator 46. A delay circuit 49 delays the inverted output pulse generated by pulse generator 32. A NOR gate 50 uses the output pulse of delay circuit 49 and the output pulse generated by pulse generator 32 as inputs. Delay circuit 49 and NOR gate 50 are configured such that they cause the sample pulse to output from the sample and hold circuit 47 that samples and holds the output voltage of loop filter 31. The delay time of delay circuit 49 is set at a time that can secure the sampling pulse width of sample and hold circuit 47. It is configured here so that the output voltage of the sample and hold circuit 47 is impressed on resonant circuit 38 superimposed on the voltage of power supply 39 across voltage-controlled variable resistor 48 to control the resonant frequency of resonant circuit 38. Here, voltage-controlled variable resistor 48, lock detector circuit 45, ramp generator 46, sample and hold circuit 47, delay circuit 49, and NOR gate 50 comprise a control circuit that controls the resonant frequency of resonant circuit 38.

Figure 6:
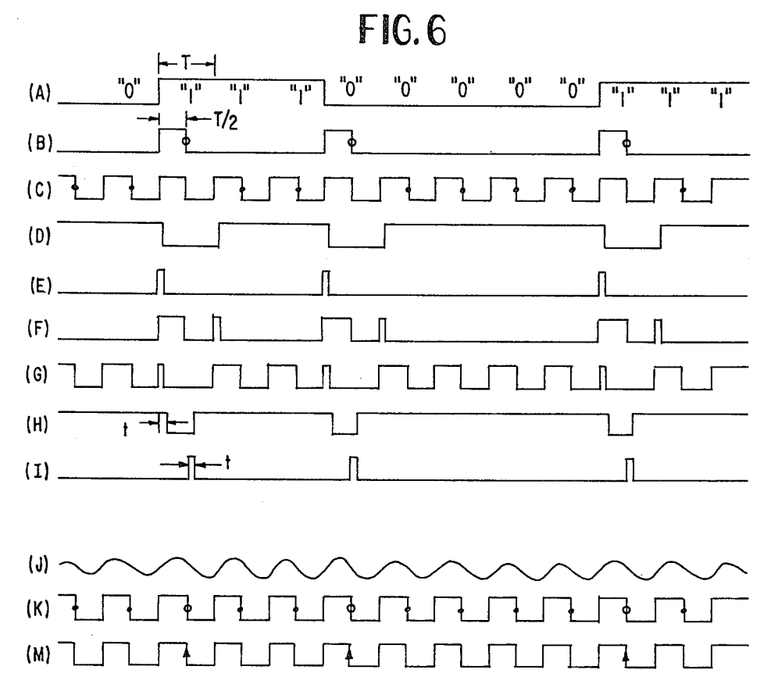

In the second practical example of this invention configured as above, an input signal shown in FIG. 6 (A) and identical to that in FIG. 4 (A) is impressed on input terminal $T_i$. As a result of the leading and trailing edges of the input signals, pulse generator 32 generates output pulses having a pulse width of T/2 and an inverted output pulse that is an inversion of the said output pulse in synchronism with the leading and trailing edges of the input signals. The output pulse of pulse generator 32 is inputted to PLL circuit 30 through AND gate 44, and its phase is compared with that of the output pulse of VCO 13 shown in FIG. 6 (M). The output pulse of differentiating circuit 33 that differentiates the input signals is as shown in FIG. 6 (E), and the output pulse of differentiating circuit 33 is impressed on resonant circuit 38. At this time, due to the fact that voltage-controlled variable resistor 48 has a high resistance value, resonant circuit 38 produces a damped oscillation of the resonant frequency which is of a slightly longer period than the clock signal period determined by the voltage of power supply 39 caused by impression of the output pulse of differentiating circuit 33. The output of resonant circuit 38 is as shown in FIG. 6 (J). The output of resonant circuit 38 is converted to rectangular waves by a square wave converter circuit 40 and impressed on AND gates 42 and 43. As explained with respect to the first practical example of this invention, the output pulse of square wave converter circuit 40 is impressed on PLL circuit 30 in the output pulse spacing of pulse generator 32, and the output pulse spacing of pulse generator 32 will be interpolated by the output pulse of square wave converter circuit 40. Consequently, the input signal of PLL circuit 30 is as shown in FIG. 6 (K). In FIG. 6 (K), "o" indicates the output pulse of pulse generator 32, and ".", the output pulse of square wave converter circuit 40. Then, due to the fact that the output pulse of pulse generator 32 has been impressed on PLL circuit 30, the output pulse phase of pulse generator 32 and the output pulse phase of VCO 13 are compared, and the output pulse of VCO 13 is phase-synchronized to the output pulse of pulse generator 32, and the PLL circuit 30 becomes locked. The fact that PLL circuit 30 is in a phase-locked state is detected by lock detector circuit 45, the ramp generator 46 outputs the ramp signal, and the voltage-controlled variable resistor 48 gradually reduces its resistance value. Delay circuit 49 delays the inverted output pulse of the output pulse of the pulse generator 32 shown in FIG. 6 (B) by time $\tau$ and generates an output shown in FIG. 6 (H). Thus, a sampling pulse having a time width $\tau$ as shown in FIG. 6 (I) is outputted from NOR gate 50 in synchronism with the trailing edge of the output pulse of pulse generator 32 shown in FIG. 6 (B). Due to this impression of a sampling pulse, the sample and hold circuit 47 holds the output voltage of loop filter 31 at the sample pulse generating point. At this point, PLL circuit 30 is in the locked state with respect to the phase of the output pulse of pulse generator 32, and the output voltage of loop filter 31 will have become the voltage that corresponds to the phase error between the output pulse of VCO 13 and the output pulse of pulse generator 32. This voltage will be held by the sample and hold circuit 47. The above-mentioned phase comparison between the output pulse of VCO 13 and the output pulse of pulse generator 32 is performed with the pulses marked with "Δ" among the output pulses of VCO 13 shown in FIG. 6 (M) and the pulses marked with "o" among the input pulses of PLL circuit 30 shown in FIG. 6 (K). As mentioned above, the resistance value of voltage-controlled variable resistor 48 is gradually being reduced by the output of ramp generator 46, the voltage held at the sample and hold circuit 47 is impressed on resonant circuit 38 across voltage-controlled variable resistor 48, and the resonance frequency of resonant circuit 38 changes in the direction of the resonant frequency determined by the output voltage of loop filter 31 held at sample and hold circuit 47. Consequently, the resonant frequency of resonant circuit 38 is changed in the direction in which the phase error between the phases of the output pulse of square wave converter circuit 40 interpolated in the output pulse spacing of pulse generator 32 and the output pulse of VCO 13 becomes zero. In other words, the resonant frequency of resonant circuit 38 will be changing so that the phase error between the output pulse of square wave converter circuit 40 and the output pulse of VCO 13 approaches the phase error when the phases are compared between the output pulse of pulse generator 32 and the output pulse of VCO 13. Since the output of resonant circuit 38 controlled in this manner is converted to a rectangular wave by square wave converter circuit 40 and interpolates the output pulse spacing of pulse generator 32, the PLL circuit 30 will not be mislocked.

Figure 7:
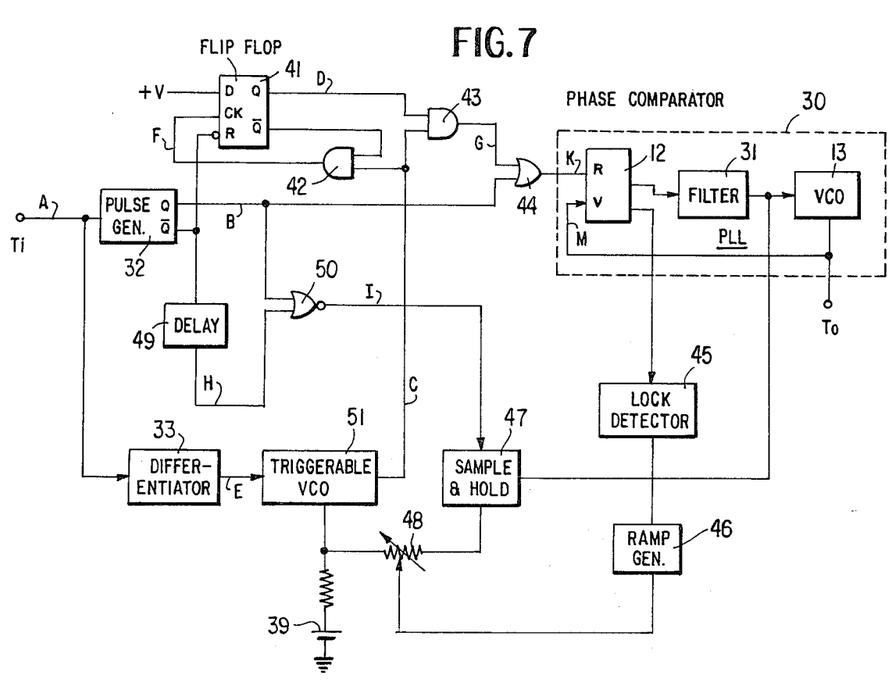
FIGS. 7 and 8 are respectively a block diagram of the third practical example of this invention and a diagram provided for the explanation of the operation of the circuit.

FIG. 7 is a block diagram of the third practical example of this invention, and the same components as in the second practical example of this invention shown in FIG. 5 are shown by using the same notations. In this practical example, instead of the resonant circuit 38 and square wave converter circuit 40 used in the second practical example of this invention shown in FIG. 5, a triggerable VCO 51 is used which is triggered by differentiating circuit 33 and its oscillation frequency is set by the voltage of the power supply at a frequency of a slightly longer period than the clock signal period contained in the input signal. This oscillation frequency of triggerable VCO 51 is set so that its timing does not deviate more than T/2 in the intervals of adjacent leading and trailing edges of the input signal, and the configuration is made such that the changing output frequency of triggerable VCO 51 is controlled by the output voltage of sample and hold circuit 47 which is impressed across voltage-controlled variable resistor 48. Other components are configured in the same manner as in the case of the second practical example of this invention shown in FIG. 5.

Figure 8:
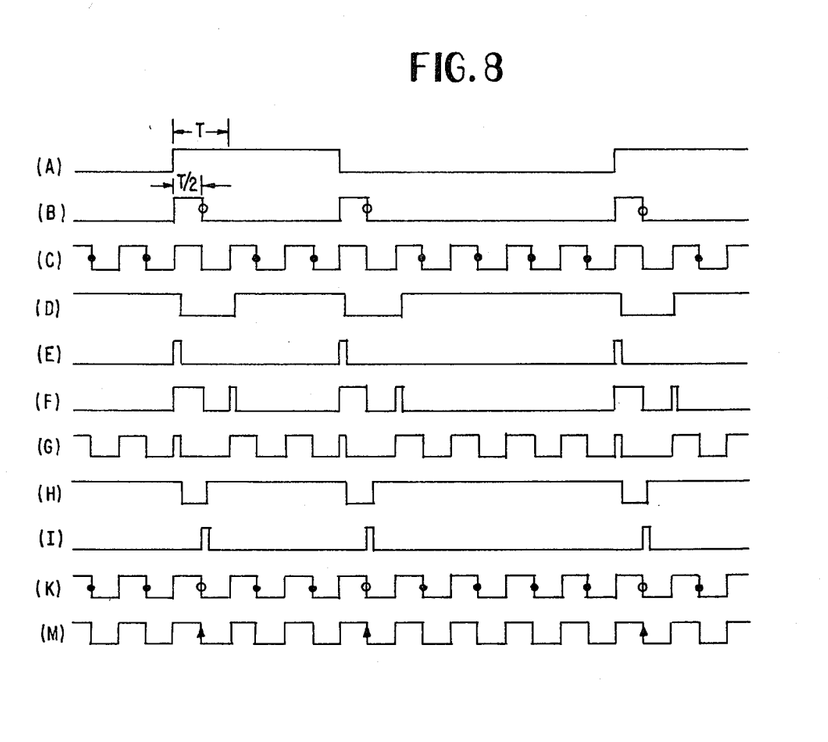

In this practical example, the action that occurs when the input signal shown in FIG. 8 (A) is impressed is completely the same as in the case of the second practical example of this invention. The waveform of the output pulse of pulse generator 32, the output waveform of triggerable VCO 51, Q output waveform of D flip-flop 41, the output waveform of differentiating circuit 33, the clock pulse waveform of D flip-flop 41, the output waveform of AND gate 43, the output waveform of delay circuit 49, the output waveform of NOR gate 50, the output waveform of OR gate 44, and the output waveform of VCO 13, i.e. the input waveform of PLL circuit 30 are as shown in FIG. 8 (B), (C), (D), (E), (F), (G), (H), (I), (K), and (M) and identical to the case of the second practical example of this invention. Therefore, a detailed explanation of their actions is omitted.

Figure 9:
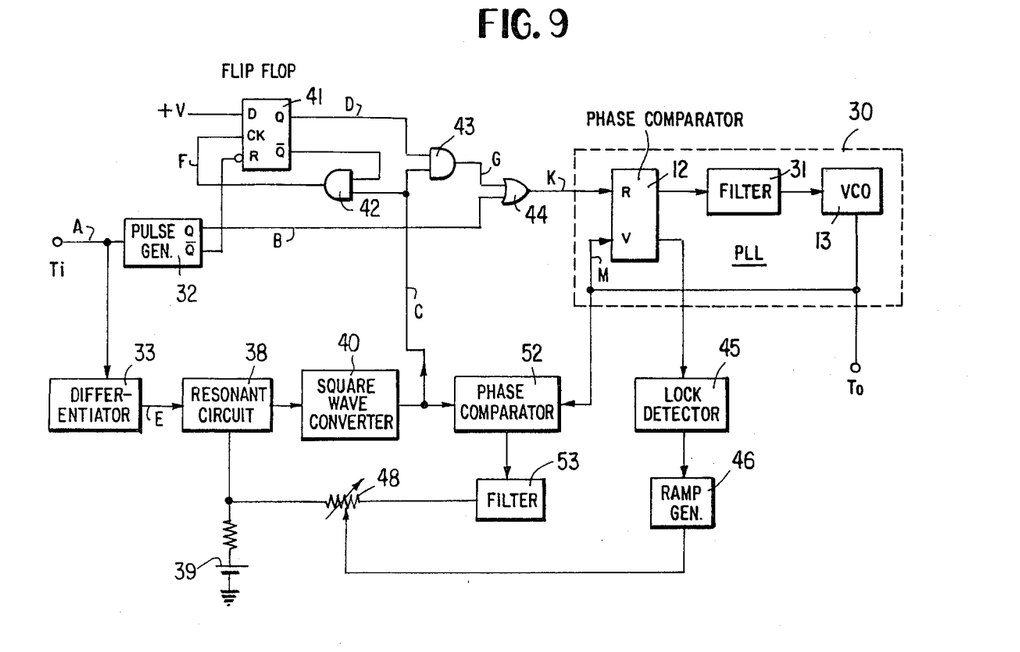
FIG. 9 is a block diagram of the fourth practical example of this invention.

FIG. 9 is a block diagram of the fourth practical example of this invention, and the components identical to those in the second practical example of this invention shown in FIG. 5 are shown with the same notations. This example is configured so that the output of square wave converter circuit 40 and the output of VCO 13 in the second practical example of this invention shown in FIG. 5 are inputted to the phase comparator 52, the output of phase comparator 52 is inputted into the loop filter 53, the output of loop filter 53 is impressed on resonant circuit 38 through a voltage-controlled variable resistor 48 and controls the resonant frequency of resonant circuit 38. Delay circuit 49, NOR gate 50, and sample and hold circuit 47 are eliminated from the second practical example shown in FIG. 5.

In this practical example configured as above, resonant circuit 38 begins a damped oscillation caused by the output of differentiating circuit 33 as in the second example of this invention. The output of resonant circuit 38 is converted to a rectangular wave by the square wave converter circuit 40 and impressed on AND gates 42 and 43, and at the same time, impressed on the phase comparator 52 and its phase is compared with that of the output of VCO 13. On the other hand, when PLL circuit 30 changes to a locked state, the locked state is detected by the lock detector circuit 45, the ramp generator 46 generates a ramp output, and the resistance value of the voltage-controlled variable resistor 48 begins to decrease. On the other hand, the output of phase comparator 52 is filtered by loop filter 53, the output voltage of loop filter 53 is impressed on resonant circuit 38 through voltage-controlled variable resistor 48, and the resonant frequency changes. This changed output of the resonant circuit 38 is converted to a rectangular wave by square wave converter circuit 40 and is compared with the output of VCO 13 by the phase comparator 52. Thus, it acts to make the output phase of square wave converter circuit 40 and the output phase of VCO 13 coincide. Consequently, in this example, as in the case of the second practical example of this invention, the output pulse spacing of pulse generator 32 is interpolated by the output of square wave converter circuit 40, the phase difference between the interpolated output phase of square wave converter circuit 40 and the output phase of VCO 13 is controlled to become zero, and it changes to approach the phase error at the time of phase comparison between the output pulse of pulse generator 32 and the output pulse of VCO 13. Resonant circuit 38 and square wave converter circuit 40 may be configured with a triggerable oscillator also.

Figure 10:
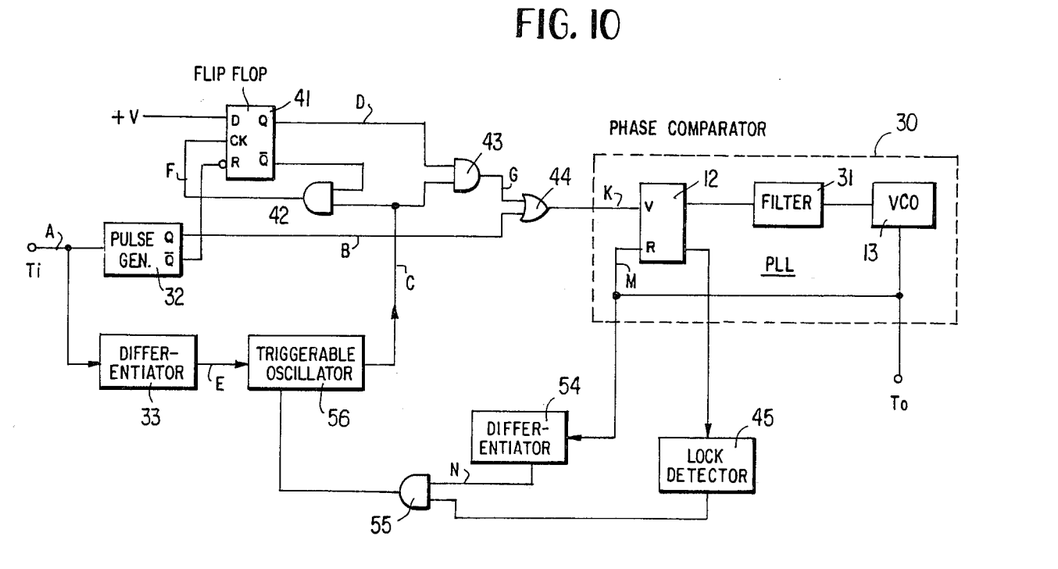
FIGS. 10 and 11 are respectively a block diagram of the fifth practical example of this invention and a diagram provided for the explanation of the operation of the circuit.

FIG. 10 is a block diagram of the fifth practical example of this invention, and the components identical to those in the first practical example of this invention shown in FIG. 3 are shown by using the same notations. In this example, in addition to the first practical example of this invention shown in FIG. 3, a lock detector circuit 45 that detects the locked state of phase comparator 12, a differentiating circuit 54 that differentiates the output pulse of VCO 13, and AND gate 55 that is inputted by the output of lock detector circuit 45 and the output of differentiating circuit 54 are installed, and it is configured so that the triggerable oscillator 56 is triggered by the output of AND gate 55.

Figure 11:
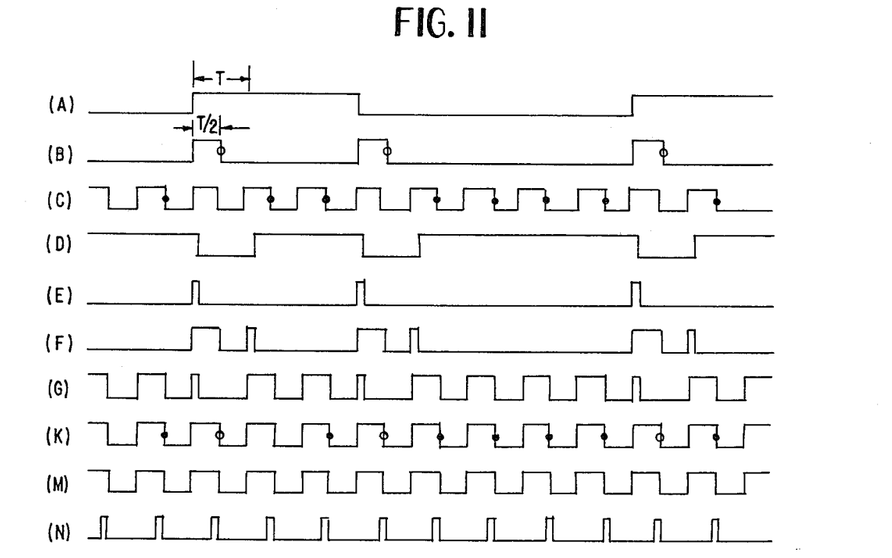

Now, suppose an input signal shown in FIG. 11 (A) is impressed, pulse generator 32 generates the output pulse shown in FIG. 11 (B), and differentiating circuit 33 generates the output pulse shown in FIG. 11 (E). And, the clock pulse of D flip-flop 41, Q output, and the output pulse of AND gate 43 are as shown in FIG. 11 (F), (D), and (G). The triggerable oscillator 56 oscillates triggered by the output pulse of differentiating circuit 33 and outputs the output pulse. Consequently, the output pulse of pulse generator 32 shown in FIG. 11 (B) is inputted to PLL circuit 30, its phase is compared at PLL circuit 30 with that of the output pulse of VCO 13 shown in FIG. 11 (M), and PLL circuit 30 synchronizes the phases of the output pulse of VCO 13 and the output pulse of pulse generator 32. When the PLL circuit is not in a locked state, the output of lock detector circuit 45 is at a low potential, and AND gate 55 has its gate closed. Consequently, in this state, the triggerable oscillator 56 oscillates triggered only by the output pulse of differentiating circuit 33, and the output pulse spacing of pulse generator 32 is interpolated by the output pulse of triggerable oscillator that oscillates triggered by and in synchronism with the output pulse of pulse generator 32. The action in this case is the same as the action in the first practical example of this invention. When the phases of the output pulse of pulse generator 32 and the output pulse of VCO 13 are compared, and PLL circuit 30 becomes locked, the locked state of the PLL circuit 30 is detected by lock detector 45, and lock detector circuit 45 changes its output to high potential. Owing to the fact that the output of lock detector circuit 45 became a high potential, AND gate 55 opens its gate. Consequently, in this state, the output pulse of VCO 13 shown in FIG. 11 (M) is impressed on the triggerable oscillator 56 through AND gate 55 by the output pulse shown in FIG. 11 (N) which was differentiated by differentiating circuit 54. Thus, triggerable oscillator 56 will be triggered by the output pulse of differentiating circuit 33 shown in FIG. 11 (E) and the output pulse of differentiating circuit 54 shown in FIG. 11 (N). Thus, in this state, triggerable oscillator 56 oscillates triggered by the output pulses of differentiating circuit 33 and 54. The output pulse spacing of pulse generator 32 will be interpolated by the output pulse of triggerable oscillator 56 triggered by the output pulse of differentiating circuit 54. Triggerable oscillator 56 may be comprised of differentiating circuit 33, a resonant circuit that damposcillates the output of AND gate 55, and a circuit that converts that output to a rectangular shape. Consequently, PLL circuit 30 maintains its locked state even in the output pulse spacing of pulse generator 32, and no mislocking occurs. FIG. 11 (B), (C), (D), (F), (G), and (K) show respectively the waveform of output pulse of pulse generator 32, the waveform of the output pulse of triggerable oscillator 56, Q output of D flip-flop 41, the clock pulse of D flip-flop 41, and output pulse of AND gate 43, and the waveform of the input pulse of PLL circuit 30. Also, in the above practical example, the output pulses of pulse generator 32 and differentiating circuit 33 were explained with an example when they are outputted in synchronism with the leading and trailing edges of the input signal. However, it may be designed such that the output pulses are generated in synchronism with the leading edge of the trailing edge of the input signal.

When this invention is applied as explained above, the interval between the leading and trailing edge, leading edge spacing, or trailing edge spacing of the input signal of the clock signal reproduction circuit are interpolated by the outputs of oscillation devices such as a resonant circuit, triggerable oscillator, or triggerable VCO, and the PLL circuit does not cause mistracking, thus enabling accurate reproduction of clock signals. In addition, the phase error between the above-mentioned interpolated output pulse of the above-mentioned oscillation devices and the output pulse of VCO controlled to approach the phase error resulting from the phase comparison between the output pulse of the pulse generating device that is generated immediately after the leading and/or trailing edge of the input signal and the output pulse of VCO. Consequently, the phase of the signal in the interpolated period is determined, and a clock signal is accurately reproduced by the PLL circuit. Furthermore, the capture range, locking range, step input response, etc. of the PLL circuit can be set with a certain freedom, and the damping coefficient and the frequency zone of the PLL circuit can be made constant. Also, in a normal state, the gain between the input terminal of the clock signal reproduction circuit and the output terminal of the VCO of the PLL circuit does not change with the timing of the leading and trailing edges of the input signal of the clock signal reproduction circuit.

What is claimed is:
1. A circuit for reproducing a clock signal comprising
    a phase lock loop circuit having a voltage-controlled oscillator that generates an oscillation output at a frequency which is approximately equal to an integral multiple of the frequency of the clock signal contained in an input signal,
    a pulse-generating device that outputs pulses of a fixed width triggered by said input signal and synchronous therewith, the output pulses of said pulse-generating device being supplied as an input to said phase lock loop circuit,
    an oscillation device that outputs pulses having approximately the same period as the clock signal period triggered by the input signal, and
    a selecting device to gate the output pulse of the said oscillation device to said phase lock loop circuit as an input in the output pulse spacing of the said pulse-generating device, the output pulse spacing of the said pulse-generating device being interpolated with the output pulse of the said oscillation device so that a clock signal output is obtained from the said phase lock loop circuit.

2. A circuit for reproducing a clock signal recited in claim 1 wherein the oscillation device is a triggerable oscillator.

3. A circuit for reproducing a clock signal recited in claim 1 wherein the oscillation device comprises a resonant circuit that produces a damped oscillation caused by the input pulse and a square wave converter circuit that converts the output of the said resonant circuit to rectangular waves.

4. A circuit for reproducing a clock signal comprising
    a phase lock loop circuit having a voltage-controlled oscillator that generates an oscillation output at a frequency which is approximately equal to an integral multiple of the frequency of the clock signal contained in an input signal,
    a pulse-generating device that outputs pulses of a fixed width triggered by said input signal and synchronous therewith, the output pulses of said pulse-generating device being supplied as an input to said phase lock loop circuit,
    an oscillation device that outputs pulses having approximately the same period as the clock signal period triggered by the input signal,
    a selecting device to gate the output pulse of the said oscillation device to said phase lock loop circuit as an input in the output pulse spacing of the said pulse-generating device, and
    a control device that controls the output pulse period of the above-mentioned oscillation device such that the phase error between the output of the said voltage-controlled oscillator and the output pulse of the said oscillation device is approximately the phase error obtained by comparing the phases of the output pulse of the said pulse-generating device and the output of the said voltage-controlled oscillator, the output pulse spacing of the above-mentioned pulse-generating device being interpolated with the output pulse of the said oscillation device whose phase error with the output of the said voltage-controlled oscillator has been controlled by said controlling device so that a clock signal output is obtained from the phase lock loop circuit.

5. A circuit for reproducing a clock signal recited in claim 4 wherein the oscillation device is a triggerable oscillator.

6. A circuit for reproducing a clock signal recited in claim 4 wherein the oscillation device comprises a resonant circuit that outputs a damped oscillation caused by the input pulse and a square wave converter circuit that converts the output of the said resonant circuit to rectangular waves.

7. A circuit for reproducing a clock signal recited in claim 4 wherein said phase lock loop further includes a phase comparator and a filter and the controlling device is comprised of
- a lock detector circuit that detects the locked state of the phase lock loop circuit,
- a ramp generator that generates a ramp voltage caused by the output of the said lock detector circuit,
- a sample and hold circuit that samples and holds the output of the phase lock loop circuit's filter in synchronism with the output signal of the pulse generator, and
- a voltage-controlled variable gain device, the gain of which is controlled by the output ramp voltage of the ramp generator and which impresses the output voltage of the above-mentioned sample and hold circuit onto the oscillation device as an external signal.

8. A circuit for reproducing a clock signal recited in claim 4 wherein the controlling device is comprised of
- a lock detector circuit that detects the locked state of the phase lock loop circuit,
- a ramp generator that generates a ramp voltage with the output of the said lock detector circuit,
- a phase comparator that performs a phase comparison between the output of the voltage-controlled oscillator of the phase lock loop circuit and the output of the oscillation device,
- a loop filter that uses the output of the said phase comparator as the input, and
- a voltage-controlled variable gain device, the gain of which is controlled by the output ramp voltage of the ramp generator and which impresses the output voltage of the above-mentioned loop filter on the above-mentioned oscillation device as an external signal.

9. A circuit for reproducing a clock signal recited in claim 4 wherein the controlling device is a gate device that comprises a lock detector circuit that detects the locked state of a PLL circuit and a differentiating circuit that differentiates the output of the voltage-controlled oscillator of the phase lock loop circuit, and triggers the oscillation device using the output of the lock detector circuit and the output of the said differentiating circuit as inputs.

* * * * *